8429X
Sheet 1 - 2 Sheets
S. Ustick,
Straw Cutter,
Patented Oct. 3, 1834
No Printed Specification Available
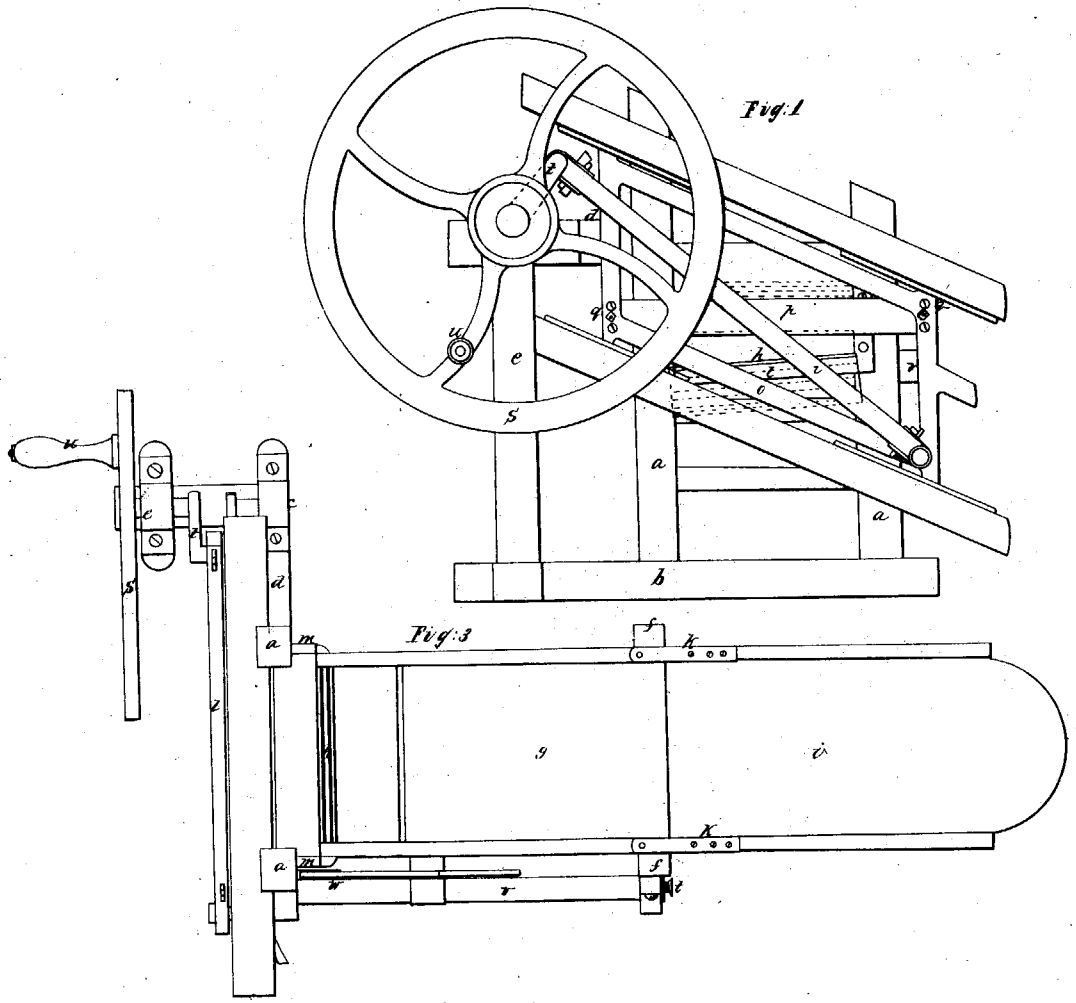
N. PETERS, PHOTO-LITHOGRAPHER, WASHINGTON, D. C.

No Printed Specification Available
8429X
Sheet 2 - 2 Sheets -
S. Ustick,
Straw Cutter,
Patented Oct. 3, 1834.
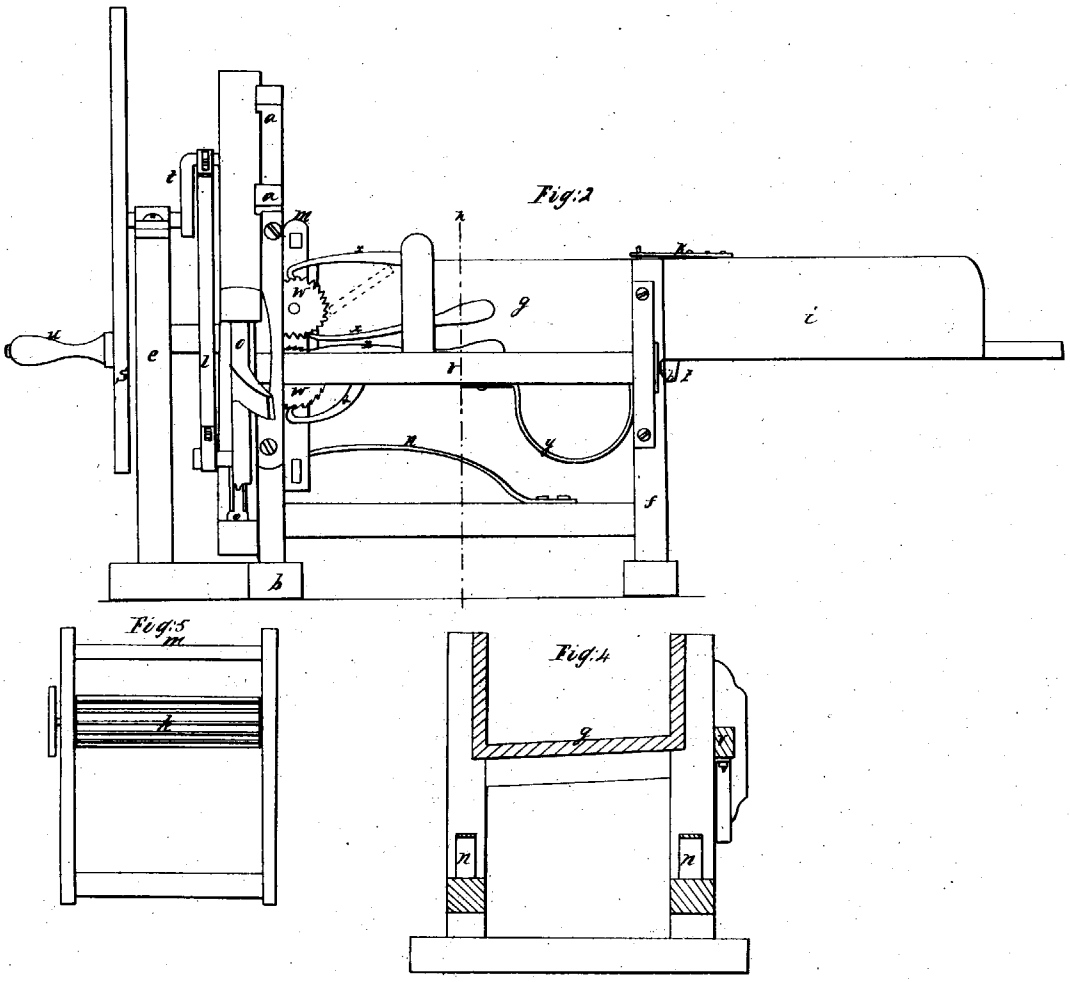
N. PETERS, PHOTO-LITHOGRAPHER, WASHINGTON, D. C.

Stephen Ustick's Strawcutter

The Schedule referred to in these Letters Patent
and making part of the same, containing a description in the
words of the said Stephen Ustick, himself of his improvements
in the Straw cutter, called Stephen Ustick's Strawcutter.

To all to whom these Presents shall come;

Be it known, that I, Stephen Ustick of
Philadelphia in the county of Philadelphia, state of Penn
sylvania have invented a new and useful improvement on the
straw cutter, and that the following for cutting, straw, hay and
cornstalks called Stephen Usticks Strawcutter, and that the
following is a full and exact description of the construction &
aporation of the said Machine as invented or improved by me In the first place I have a frame constructed as
follows - Two posts which I call the front trough posts, are
framed into a base piece, one foot asunder; said base piece
extends beyond the right hand post, and has a post which
I call the first crank post framed into it 6 inch<sup></sup>s from said
post; the first crank post is framed at top into one end of a
rail, which is framed at its other end into the right hand
troughpost above specified - This rail serves as a foundation
for a gudgeon box of the crank which is described below. The
other gudgeon box of the crank rests on a cap of a post which
I call the second crank post, which is in front of the first one
and connected by two rails one near the bottom of the posts
and the other so far below the top, as to allow the cranks
above specified to work above it - There are two posts which
I call the back trough posts framed into a base of the same
distance asunder as the front trough posts and are connected
above by a rail on which the back end of the trough is
nailed - The back trough posts are framed [illegible] on one

8439X end of two rails which are framed at their other end into front trough
posts – The sides of the trough are framed into the front trough posts
at one end and nailed at their other end on the inside edges of the back
trough posts, the said posts being cut out the thickness of the sides to
receive them – The bottom of the trough is in a horizontal position length
wise. The right hand edge is one inch lower than the left hand one. It
extends from the back of the sides of the trough to a fluted cast iron
feedroller in front, whose gudgeons turn in the side of the trough just
behind the front trough posts – The top of said roller extends 1 inch
above the bottom of the trough – The sides of the trough are tapered
from the said feedroller to their back end, to make the trough wider
behind than before – This trough is only 2 feet in length – I extend
the trough 2 feet 6 inch^s further by having a separate trough to
fit at front to its back; and fastened thereto, by having strips of
iron fastened on the top edges at front, which extend over the top
of the back trough posts and fit by means of holes in their front
ends on iron pins which are permanent in the ends of the posts
and by a strip nailed on the back of the first trough at the sides
and bottom – The trough is made in two pieces as described above
for the purpose of the back part being taken off, when the machine
is not in use, so that the machine may then take up but little
room. There is an opposing edge fastened on the mouth of the
trough by means of screws, it consists of a bottom and 2 upright
therefrom, the screws are in the uprights – The top of the bottom
part of said edge ranges with the top of the feedroller above spe
cified and is of the same height – There is a strip of iron, exten
ding from it to the roller in a descending position, which serves
to guide the straw in front of the roller over the opposing edges –
There is another feedroller like the above over it – It is in a
horizontal position lengthwise and its gudgeon works in a
frame whose uprights work between the front trough posts and
strips which are fastened to the sides of the trough. The uprights have
a rail at top above the roller and one at their bottom which is near the bottom side rails of the Machine- There are two springs one to each side of the said frame which are fastened at one end to the bottom side rails of the machine their other ends bear on the bottom rail of the roller frame- These springs are to incline the upper roller towards the lower one, to compress the straw—

There is a cast iron frame, with short tongues at each corner which slide in cast iron grooves inserted in edges of two rails which are fastened on the front of the machine by means of screws or bolts. Said rails are in an oblique position, and may be more or less oblique running downwards from the right side of the machine. There is a Knife at the back side of said frame, in such a position with it as to be parallel with the top feedroller- The back edge of it comes against shoulders of the frame- Each end of the bevelside rests on two screws, which run through the frame- There is one screw at each end of the Knife in a counter position with the above and between them The heads of these are countersunk into the face of the Knife— They have taps on their tail ends, which bear against the front of the Knife frame- The use of the first described screw is to regulate the set of the Knife, the Knife frame vibrates by means of a crank and pitman — The pitman is connected with the frame by a pivot which is fastened in the lower corner of the latter- There is a balance wheel on the front end of the crank, which has a handle in one of its arms by which the crank is turned In the downward motion of the Knife frame, the Knife cuts the straw; when it has nearly returned, the straw is fed by means of a slope Knob of the lower end of the frame working against the front end of a horizontal shaft which works in boxes that are screwed to the trough posts of that side of the machine, there being a Catch hung on the inside of said shaft which operates on a ratchet wheel of the bottom roller and one hung to an upright of said shaft, operates on a ratchet wheel of the top roller. The upper catch is above its ratchet wheel,

[illegible]

the lower one is below its ratchet wheel, it is kept up against it, by the
tail of it being heavier than the bill part- The top roller is kept from
turning backwards by means of two palls being on the upright of
the roller frame operating on the ratchet wheel- The bottom roller
is kept from turning back, by two palls being on the guiding strip
of the Knife frame at that side of the Machine- The upright of
the roller frame has a slit in it, which works over the gudgeon of the
bottom roller on which the ratchet wheel is. As the Knife frame goes
down, the catch shaft above described slips forward by means of a
half circle spring, whose tail bears against the back box of the catch shaft
its head is screwed on the lower edge of the shaft- The feed of the rollers
is regulated by a flat head screw in the back end of the catch shaft
which slides in a hole of a plate fastened on the trough post; The
head of said screw coming against the plate, prevents the catch shaft
being pushed too far forward by the spring described above —

There is a board with the grain of the wood perpendicular
fastened to the upper rail of the roller frame above described in front
of the upper roller, extending to within 1/2 inch in height of the bottom
of the roller. Its face is nearly as far in front as the opposing edge
The use of it is, to prevent the straw from rising on the upward motion
of the Knife- By the position of the Knife with the rollers and the
opposing edge and the direction of the Knife frame as described above,
I get a much greater draw of the Knife on the straw, than can otherwise
be obtained with a crank of equal length, which makes it cut much easier

What I claim as my invention, is the arrangement of the bottom
of the trough- the opposing edge- The feed rollers- The position of the
Knife and the direction of the Knife frame, collectively, and the ge-
neral construction of the Machine as above described —

In testimony, that the above is my invention I have
hereunto affixed my hand, this nineteenth day of September in
the year of our Lord One thousand Eight Hundred and
thirty two. Witnesses
John Pinms   sig: Stephen Ulslick
Allen Ward.   [1549 words]

Re. 11 P.

[illegible] Oct 1839
[illegible]